T866036

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1439

823,507

SILVER HALIDE EMULSIONS CONTAINING DISULFIDES AS FOG INHIBITORS

Norman W. Kalenda and Dorothy J. Beavers, both % Kodak Park Division, Rochester, N.Y. 14650

Filed May 9, 1969. Published Sept. 30, 1969

**Int. Cl. G03c *1/34***

U.S. Cl. 96—109

No Drawing. 10 Pages Specification

Photographic silver halide emulsions and photographic elements containing as an antifoggant and fog stabilizer a compound represented by the general formula:

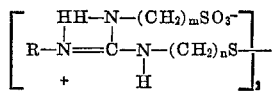

wherein R is an alkyl or aryl and *m* and *n* are each positive integers of 1 to 6.

Silver halide emulsions and elements stabilized and inhibited against the effects of fog as described can be chemically sensitized, e.g., with noble metal sensitizers alone or in combination with sulfur or selenium sensitizers. They can contain spectral sensitizers, incorporated color-forming couplers, incorporated developing agents, other antifoggants, stabilizers, hardeners, plasticizers, coating aids, vinyl polymers, and other suitable photographic addenda such as described in U.S. Patent 3,297,446 of Dunn issued Jan. 10, 1967 (columns 4–9).